: 3,557,239
Patented Jan. 19, 1971

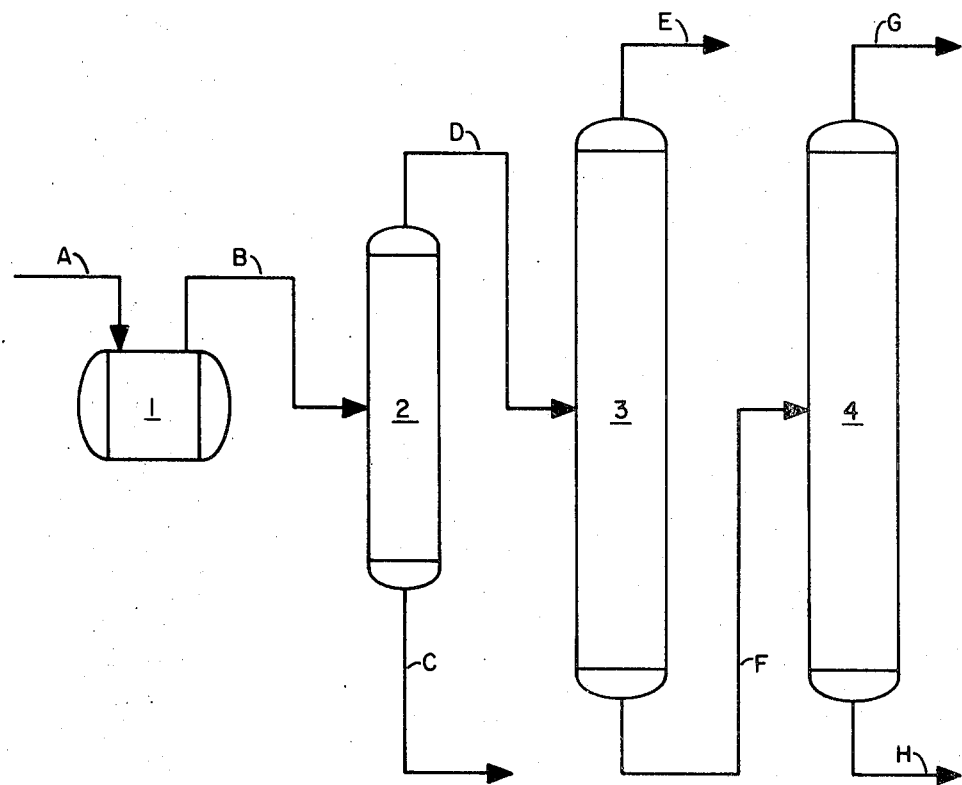

3,557,239
TREATMENT OF ISOPRENE STREAMS
Herbert J. Gebhart, Jr., Ferguson, and Earle C. Makin, Jr., St. Louis, Mo., and Charles H. Middlebrooks, Dickinson, Tex., assignors to Monsanto Company, St. Louis, Mo., a corporation of Delaware
Continuation-in-part of abandoned application Ser. No. 634,577, Apr. 28, 1967. This application Dec. 31, 1969, Ser. No. 889,692
Int. Cl. C07c 7/00; B01d 3/14, 3/34
U.S. Cl. 260—681.5
6 Claims

ABSTRACT OF THE DISCLOSURE

A process for the separation of a $C_5$ hydrocarbon stream into its components by first heat-treating the stream at temperatures of 90 to 110° C. for 1–3 hours, to dimerize a major portion of the cyclopentadiene, followed by three successive distillations to produce four concentrates, a dicyclopentadiene concentrate, a concentrate of constituents more volatile than isoprene, an isoprene concentrate, and piperylenes concentrate.

BACKGROUND OF THE INVENTION

This application is a continuation-in-part of application Ser. No. 634,577 filed Apr. 28, 1967, now abandoned.

The present invention relates to a method for the treatment of a $C_5$ hydrocarbon stream containing such compounds as isoprene, cyclopentadiene, and piperylene so as to produce an isoprene concentrate, a piperylene concentrate, and a dicyclopentadiene concentrate.

Both isoprene and piperylene are widely used in the preparation of synthetic rubber and various other resinous materials. The recovery of the isoprene and piperylene concentrates separately is beneficial for any subsequent purification such as extractive distillation. The recovery of the dicyclopentadiene concentrate is beneficial as it may be depolymerized to cyclopentadiene such as by the processes disclosed in U.S. Pat. 2,490,866. Cyclopentadiene thus recovered may be used as a modifier for drying oils, as a reactant in the manufacture of resinous co-polymers, and in the preparation of textile impregnating agents.

Various methods have been proposed for producing isoprene, piperylene, and dicyclopentadiene concentrates from hydrocarbon streams and many of these processes have involved a dimerization treatment of any cyclopentadiene present so as to facilitate separation of the stream into its various components. However, these prior art processes generally have low efficiency which is mainly due to the fact that large amounts of isoprene are lost by co-dimerization with cyclopentadiene, both in the dimerization treatment and in various distillation steps involved.

It is thus an object of the present invention to provide a method for the treatment of a $C_5$ hydrocarbon stream containing isoprene, piperylene, and cyclopentadiene so as to produce an isoprene concentrate, a piperylene concentrate and a dicyclopentadiene concentrate.

It is a further object of the present invention to provide a method for the production of an isoprene concentrate, a piperylene concentrate, and a dicyclopentadiene concentrate whereby losses from the co-dimerization of isoprene and dicyclopentadiene are reduced.

Additional objects will become apparent from the following description of the present invention.

SUMMARY OF THE INVENTION

These and other objects are accomplished in the present invention which in one of its embodiments is a process for the separation of a $C_5$ hydrocarbon stream containing isoprene, piperylene, and cyclopentadiene comprising (1) passing said $C_5$ hydrocarbon stream to a dimerization zone so as to dimerize at least 90% by weight of said cyclopentadiene to dicyclopentadiene, said dimerization zone being maintained at a temperature of from about 90 to 110° C., the residence time of said $C_5$ hydrocarbon stream in the dimerization zone being from about 1 to 3 hours, (2) withdrawing the effluent from said dimerization zone and passing said effluent to a first fractional distillation zone having at least five distillation plates and a reflux ratio greater than 0.2:1, said first fractional distillation zone being maintained so as to have a kettle temperature of from about 100 to 150° C., (3) withdrawing from said first fractional distillation zone a bottoms product comprising *dimers of cyclopentadiene* and an overhead product comprising mainly $C_5$ hydrocarbons, (4) passing said overhead product of said first distillation zone to a second fractional distillation zone and removing an overhead product comprised mainly of hydrocarbons having a lower boiling point than isoprene and a bottoms product comprising isoprene and hydrocarbons having a higher boiling point than isoprene, said second fractional distillation zone having at least 40 distillation plates and a reflux ratio of at least 8:1, and (5) passing said bottoms product of said second fractional distillation zone to a third fractional distillation zone and withdrawing an isoprene concentrate overhead and a piperylene concentrate as bottoms product, said third fractional distillation zone having at least 50 distillation plates and a reflux ratio of at least 8:1. The term reflux ratio as used herein is the ratio of reflux volume to net overhead product volume.

DESCRIPTION OF THE PREFERRED EMBODIMENTS

The sole figure is a flow scheme of a particularly preferred embodiment of the present invention. Referring now to the figure for an explanation of the present invention, a $C_5$ hydrocarbon feed stream A containing cyclopentadiene and isoprene enters dimer tank 1 so as to effect dimerization of at least 90 wt. percent preferably at least 95 wt. percent of the available cyclopentadiene while effecting dimerization as co-dimerization or less than 10 wt. percent, preferably less than 5 wt. percent of the available isoprene. The $C_5$ hydrocarbon streams to which the present invention is applicable may contain in addition to cyclopentadiene and isoprene such compounds as pentanes, pentenes, piperylene, and the like. However, the term "$C_5$ hydrocarbon stream" is not to be construed as being limited to a stream consisting of only $C_5$ hydrocarbons. The $C_5$ hydrocarbon stream should contain at least 85% $C_5$ hydrocarbons but can also contain such impurities as $C_4$ hydrocarbons, $C_6$ hydrocarbons, etc. The present invention is particularly applicable to $C_5$ streams containing from 10 to 35% by weight isoprene. 5 to 25% by weight cyclopentadiene and 8 to 30% by weight piperylene. The temperatures within dimer tank 1 must be held to from about 90 to 110° C. in order to secure the benefits of the present invention, although it is preferable to control the temperature at about 100° C. or at least within the range of 95 to 105° C.

The dimer tank may be any type drum or vessel which is of such a size that the residence time of the $C_5$ hydrocarbon stream may be maintained so as to be from 1 to 3 hours, preferably 1½ to 2½ hours. Longer times than this will result in unwanted, co-dimerization of isoprene and cyclopentadiene while shorter times will not allow a sufficient degree of dimerization to take place. Dimer tank 1 may be equipped with baffles, packing, and the like, to aid in head distribution. Since the dimerization is an exothermic reaction, the dimer drum may be equipped with various types of internal heat exchange equipment. In this regard, the pressure within the dimer tank may be adjusted to control the temperatures within the limits defined herein by adjusting such pressure to provide for at least a portion of the components of the feed stream within the dimer tank to be continuously refluxing within such temperature limitations. Pressures required for maintaining such continuous refluxing of feed materials within the dimer tank while maintaining such feed materials within the range of 90 to 110° C. are generally 50 to 150 p.s.i.g., preferably 50 to 100 p.s.i.g.

The effluent from dimer tank 1, as represented by stream B, is passed to stripping column 2 so as to separate a bottoms product stream C comprised mainly of dicyclopentadiene and the other $C_6+$ hydrocarbons and overhead products stream D comprising mainly $C_5$ hydrocarbons. Bottoms product stream C is the dicyclopentadiene concentrate and may be further treated according to known methods to recover the cyclopentadiene therefrom or may be further purified, if necessary, so as to provide dicyclopentadiene to be used as a component of resinous materials. The overhead product stream D of stripping column 2 is comprised mainly of piperylene and components boiling lower than piperylene such as isoprene, pentene-1, and any $C_4$ hydrocarbons which may be present. In order to accomplish this separation effectively, stripping column 2 must have at least five distillation plates and a reflux ratio of at least 0.2:1, preferably 0.5:1. Further, stripping column 2 must be operated such that the kettle temperature is maintained below about 150° C. and is preferably between 100 and 150° C. The overhead vapors that are suitable should be within the range of 30 to 65° C. When utilizing these temperatures in stripping column 2, pressures on the order of 2 to 20 p.s.i.g. are suitable.

It is also sometimes desirable to operate the present process such that stream B is preheated to a temperature of about 130 to 160° C. prior to entry to stripping column 2 and to operate so that overhead product stream D contains less than about 2% by weight dicyclopentadiene. Excessive foaming sometimes occurs when these conditions are not observed.

Overhead product stream D of stripping column 2 is passed to a second fractional distillation zone shown as fractionating column 3 and a light ends stream E is removed as overhead product and stream F is removed as bottoms product. The overhead product stream E is comprised mainly of hydrocarbons having a lower boiling point than isoprene such as $C_4$ hydrocarbons, 2-methylbutene-1, isopentane, and pentadiene-1,4. Bottoms product stream F is comprised mainly of isoprene and higher boiling components than isoprene including piperylene, n-pentane, cyclopentene, etc. Fractionating column 3 should have at least 40 distillation plates, preferably at least 60 plates, in order to effect the desired separation. It is desirable to operate fractionating column 3 at pressures of about 10 ot 40 p.s.i.g. and under these pressures the bottoms temperature is maintained at about 65 to 85° C. and the overhead vapors at about 45 to 75° C. The reflux ratio of fractionating column 3 should be maintained above 8:1, preferably above 15:1.

After being withdrawn from bottom of fractionating column 3, stream F is passed to a third fractional distillation zone as represented by fractionating column 4. In fractionating column 4 stream F is separated into an overhead product stream G which is the isoprene concentrate and a bottoms product stream H which is a piperylene concentrate. Fractionating column 4 should have at least 50 distillation plates and preferably at least 60 plates. In fractionating column 4, pressures in the range of 15 to 40 p.s.i.g. are used. Under these pressures, the bottoms temperature of fractionating column 4 is maintained in the range of 70 to 90° C. and the overhead vapor temperature is maintained in the range of 55 to 75° C. The reflux ratio in fractionating column 4 should be maintained above 8:1, preferably above 12:1.

In order to more clearly illustrate the present invention, the following example is presented. In this example, a continuous process is illustrated in which the dimer tank is operated such that approximately 80 to 90 vol. percent of its free space is occupied by the liquid feed materials and reaction product and such as to maintain refluxing of at least a portion of the materials therein. The effluent from the dimer drum is passed to a first column of 8 trays. From this first, a bottoms product is taken which contains the greater part of the $C_6$ and heavier (dimers) hydrocarbons in the dimer tank effluent. The remainder of the dimer tank effluent passes overhead from the first column and is introduced into approximately the midpoint of a second distillation column which contains 70 trays. From this second column is taken an overhead comprising the lower boiling $C_5$ hydrocarbons and the $C_4$ hydrocarbons of the dimer tank effluent. This second column is operated at a reflux ratio of approximately 20:1. The bottoms of this second column which contains primarily isoprenes and piperylenes along with other $C_5$ hydrocarbons is passed into a third distillation column at approximately the midpoint thereof. This distillation column also has 70 trays. The overhead product of this column is an isoprene concentrate while the bottoms product is a piperylene concentrate. This column is operated at a reflux ratio of approximately 15:1.

The operating conditions of the dimer tank and the three distillation columns are presented in Table I below. The compositions of the feed and the product streams of the dimer tank and distillation columns are presented in Table II below. Such compositions are given in pounds based on 100 pounds of feed. In Table II, the streams are designated as follows.

Stream: Designation
    Feed _____ A
    Dimer tank effluent _____ B
    Bottoms, 1st column _____ C
    Overhead, 1st column _____ D
    Bottoms, 2nd column _____ F
    Overhead, 2nd column _____ E
    Bottoms, 3rd column _____ H
    Overhead, 3rd column _____ G

TABLE I.—PROCESS CONDITIONS

| | Dimer tank | First column | Second column | Third column |
|---|---|---|---|---|
| Pressure, p.s.i.g. | 65 | 2–20 | 5–40 | 15–40 |
| Overhead temp., °C. | | 30–65 | 45–75 | 55–75 |
| Bottoms temp., °C. | | 100–150 | 65–85 | 70–90 |
| Temperature, °C. | 200 | | | |
| Residence time, hrs. | 2½ | | | |

TABLE II

| Component | Stream | | | | | | | |
|---|---|---|---|---|---|---|---|---|
| | A | B | C | D | E | F | G | H |
| $C_4$ | 1.5 | 1.5 | | 1.5 | 1.5 | | | |
| Isoprene | 26.0 | 24.8 | | 24.8 | 1.2 | 23.6 | 22.6 | 1.0 |
| Cyclopentadiene | 14.3 | 0.5 | | 0.5 | | 0.5 | 0.1 | 0.4 |
| Piperylenes | 17.0 | 17.0 | | 17.0 | | 17.0 | 0.1 | 16.9 |
| Other $C_5$'s | 39.2 | 37.4 | | 37.4 | 14.4 | 23.0 | 14.6 | 8.4 |
| $C_6+$ | 2.0 | 18.8 | 17.0 | 1.8 | | 1.8 | | 1.8 |
| Total | 100.0 | 100.0 | 17.0 | 83.0 | 17.1 | 65.9 | 37.4 | 28.5 |

As may be seen from Table II, the present invention is capable of producing an isoprene concentrate containing over 60% by weight isoprene while recovering about 87% of the isoprene in the feed in such concentrate.

What is claimed is:
1. A process for the separation of a hydrocarbon stream containing isoprene, piperylene and cyclopentadiene, said process comprising
    (1) passing a hydrocarbon stream containing at least 80% by weight $C_5$ hydrocarbons, said $C_5$ hydrocarbons containing from about 10 to 35% by weight isoprene, 5 to 25% by weight cyclopentadiene, and 8 to 30% by weight piperylene, to a dimerization zone so as to dimerize at least 85% of said cyclopentadiene but less than 10% of said isoprene, said dimerization zone being maintained at a temperature of from about 90 to 110° C. and a pressure such that at least a portion of said stream within said dimerization zone will be refluxing, the residence time of said $C_5$ hydrocarbon stream in the dimerization zone being from about 1 to 3 hours, (2) withdrawing the effluent from said dimerization zone and passing said effluent to a first fractional distillation zone at a temperature of from about 130 to 160° C., said first fractional distillation zone having at least five distillation plates and a reflux ratio greater than 0.2:1, said first fractional distillation zone being maintained so as to have a kettle temperature of from about 100 to 150° C., (3) withdrawing from said first fractional distillation zone a bottoms product comprising cyclopentadiene dimers and an overhead product comprising mainly $C_5$ hydrocarbons, (4) passing said overhead product of said first distillation zone to a second fractional distillation zone and removing an overhead product comprised mainly of hydrocarbons having a lower boiling point than isoprene and a bottoms product comprising isoprene and hydrocarbons having a higher boiling point than isoprene, said second fractional distillation zone having at least 40 distillation plates and a reflux ratio of at least 8:1, and (5) passing said bottoms product of said second fractional distillation zone to a third fractional distillation zone and withdrawing an isoprene concentrate overhead and a piperylene concentrate as bottoms product, said third fractional distillation zone having at least 50 distillation plates and a reflux ratio of at least 8:1.

2. The process of claim 1 wherein said dimerization zone is maintained at a temperature of from about 95 to 105° C. and the residence time in said dimerization zone is about 1½ to 2½ hours.

3. The process of claim 1 wherein at least 95% of the available cyclopentadiene is dimerized in said dimerization zone.

4. The process of claim 1 wherein no greater than 5% of the available isoprene is dimerized.

5. The process of claim 1 wherein said second fractional distillation zone has at least 60 distillation plates and a reflux ratio of at least 15:1, and said third fractional distillation zone has at least 60 distillation plates and a reflux ratio of at least 12:1.

6. The process of claim 1 wherein the pressure in said dimerization zone is maintained from about 50 to 150 p.s.i.g.

References Cited

UNITED STATES PATENTS

| 2,387,993 | 10/1945 | Hepp | 260—674 |
| 2,397,580 | 4/1946 | Ward | 260—666 |
| 2,704,778 | 3/1955 | Maisel | 260—666 |
| 2,733,285 | 1/1956 | Hamner | 260—674 |
| 2,768,224 | 10/1956 | Page et al. | 260—681.5 |
| 2,773,106 | 12/1956 | Hamner | 260—681.5 |
| 3,012,947 | 12/1961 | Kelley et al. | 260—39.5 |
| 3,230,157 | 1/1966 | Hill et al. | 203—53 |
| 3,301,915 | 1/1967 | King et al. | 260—681.5 |

FOREIGN PATENTS

| 658,449 | 10/1951 | Great Britain | 260—681.5 |

DELBERT E. GANTZ, Primary Examiner

G. E. SCHMITKONS, Assistant Examiner

U.S. Cl. X.R.

203—28, 74

UNITED STATES PATENT OFFICE
CERTIFICATE OF CORRECTION

PO-1050
(5/69)

Patent No. U. S. 3,557,239          Dated January 19, 1971

Inventor(s) Herbert J. Gebhart, Jr., Earle C. Makin, Jr., and Charles H. Middlebrooks It is certified that error appears in the above-identified patent and that said Letters Patent are hereby corrected as shown below:

Column 2, line 57, after the word "isoprene" there should be a comma instead of a period.

Column 3, line 58, after the number "10", change "ot" to --to--.

Column 4, line 51, Table I, under the column entitled "Dimer Tank", change "200" to --100--.

Signed and sealed this 22nd day of June 1971.

(SEAL)
Attest:

EDWARD M. FLETCHER, JR.
Attesting Officer

WILLIAM E. SCHUYLER, JR.
Commissioner of Patents